United States Patent Office

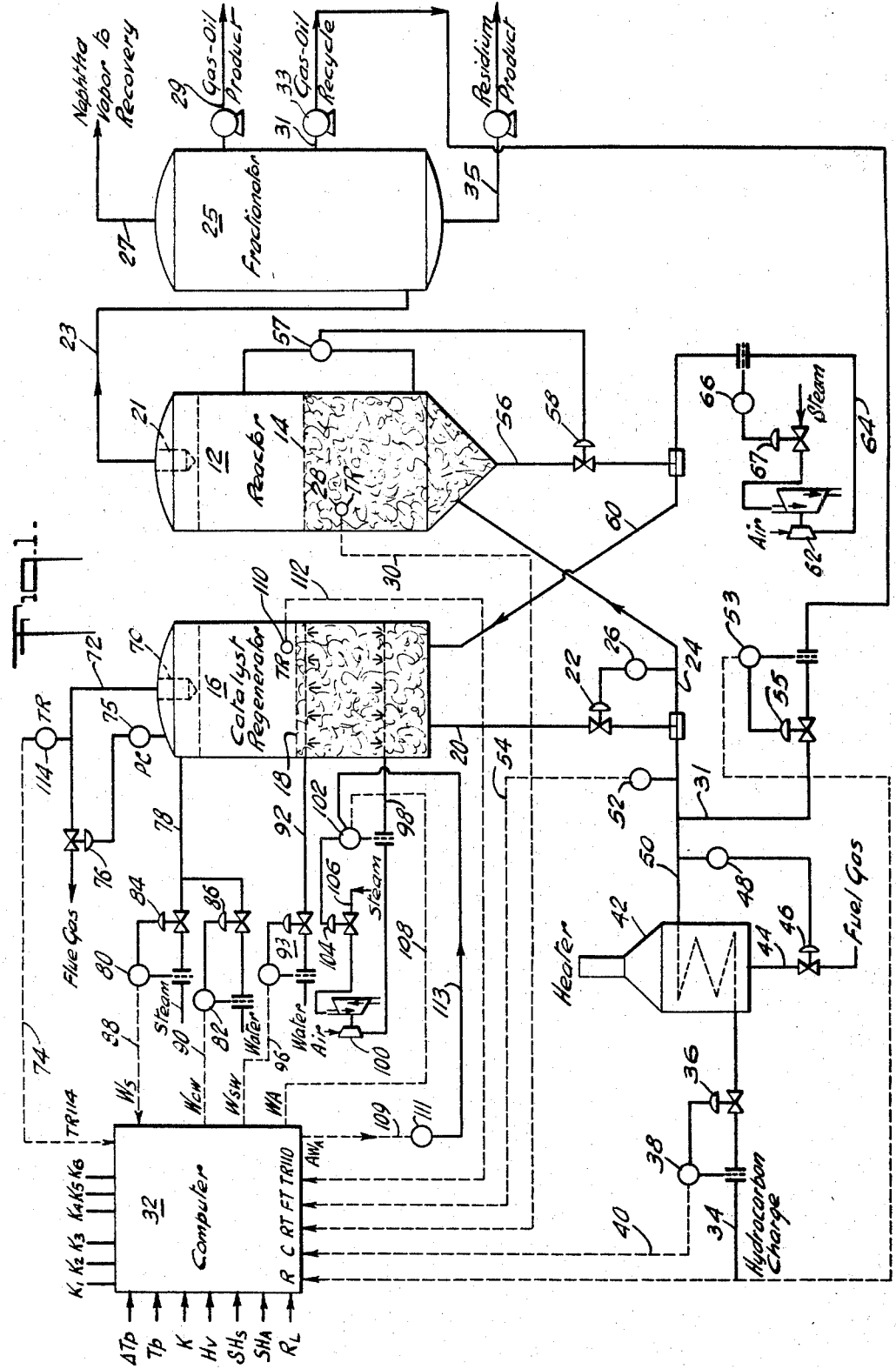

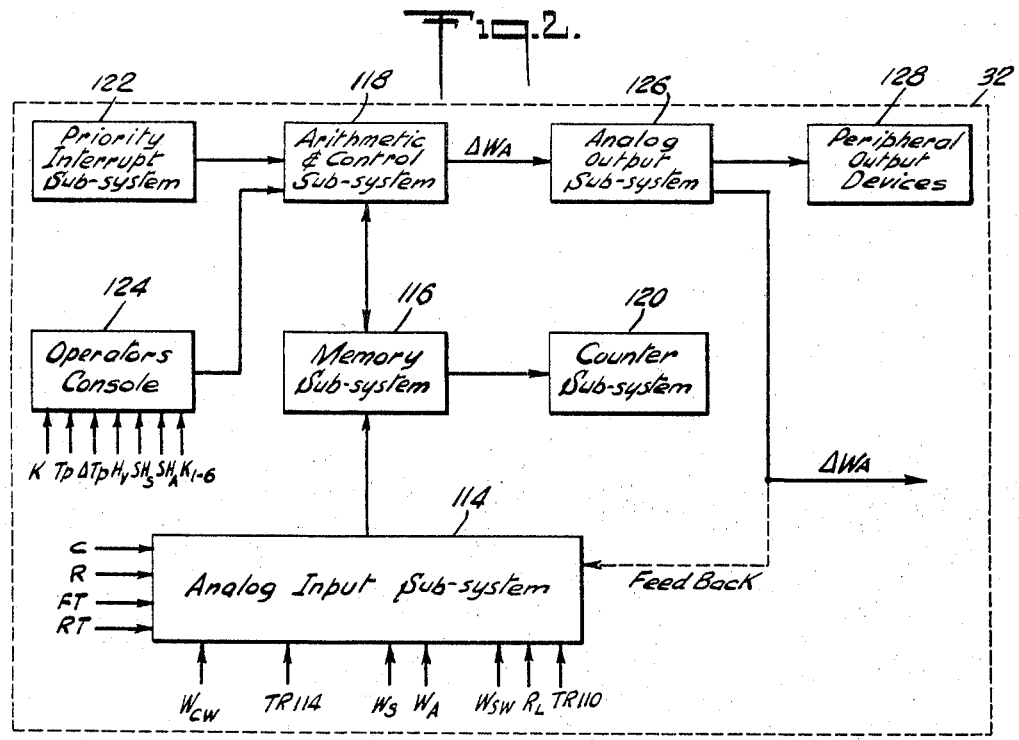
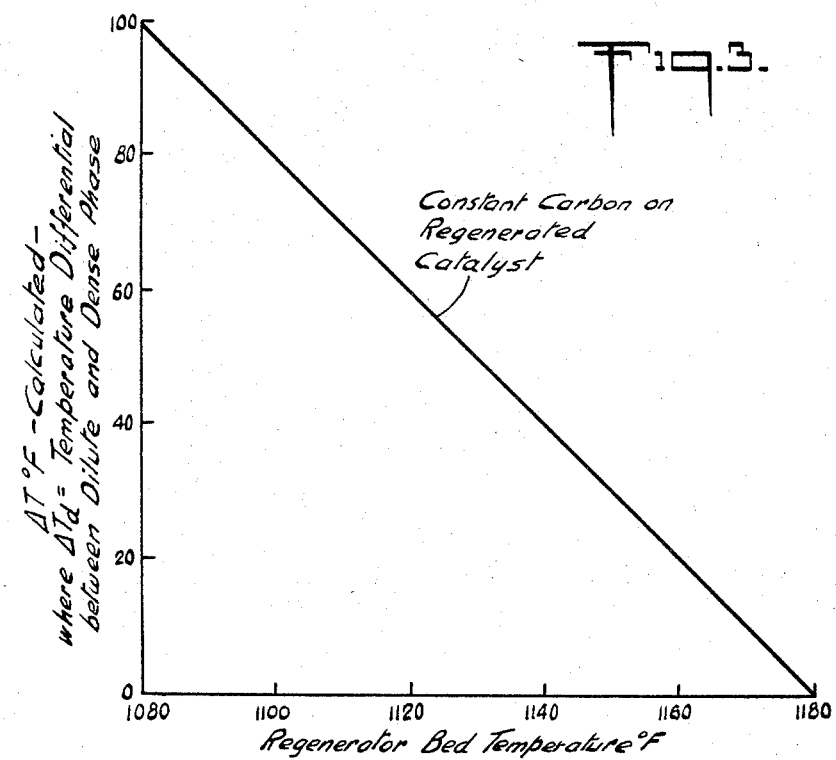

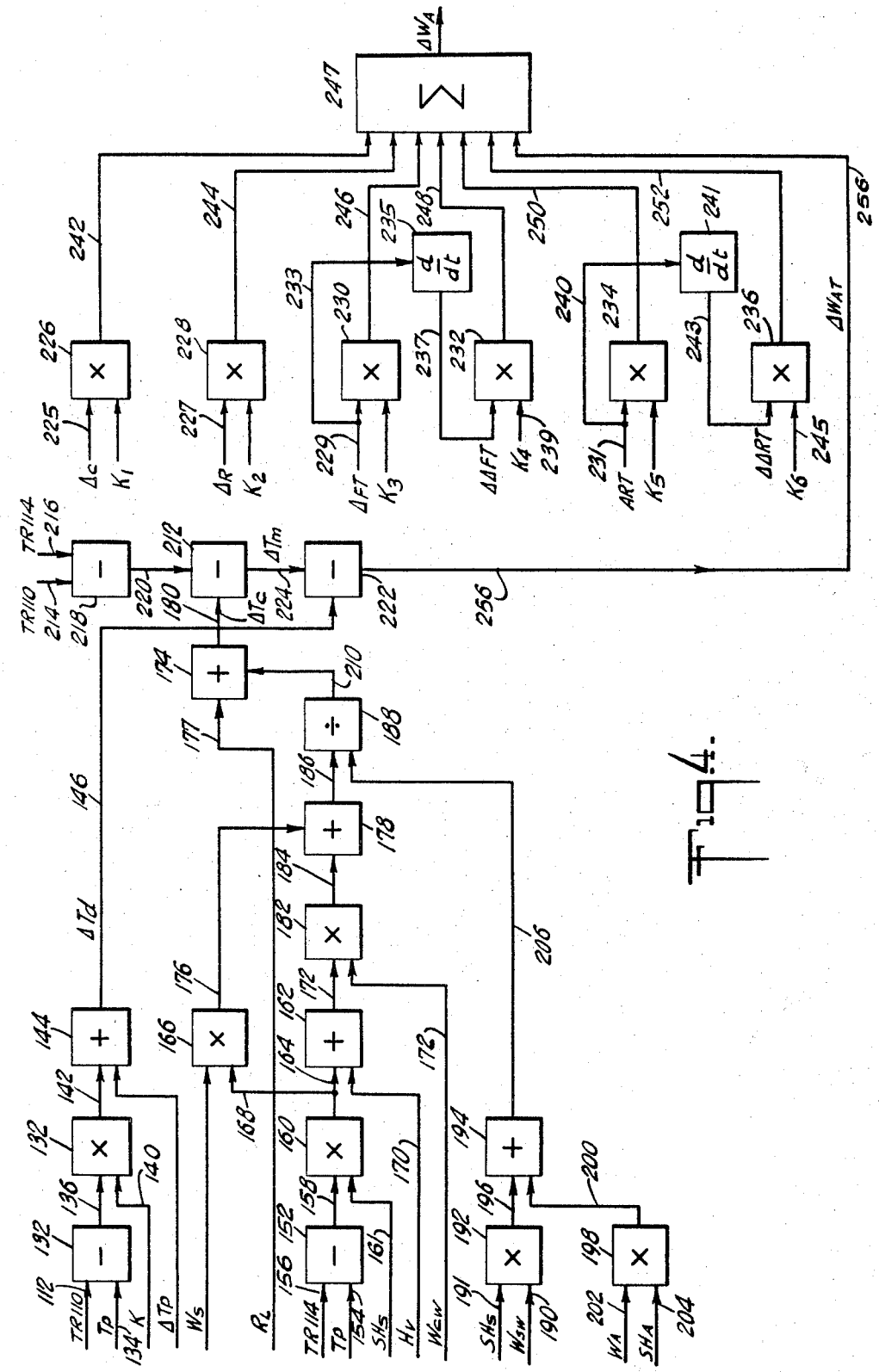

3,410,793
Patented Nov. 12, 1968

3,410,793
METHOD AND APPARATUS FOR CONTROLLING THE REGENERATION OF CONTAMINATED SOLIDS IN A FLUIDIZED SYSTEM
John J. Stranahan and Leland A. Chvatal, Port Arthur, and James C. Kite, Groves, Tex., assignors to Texaco, Inc., New York, N.Y., a corporation of Delaware
Filed June 27, 1966, Ser. No. 560,514
4 Claims. (Cl. 208—159)

ABSTRACT OF THE DISCLOSURE

A fluid catalytic cracking process including a catalytic cracking reactor, a catalyst regenerator and a computer for controlling the amount of combustion air fed to the regenerator, in which regenerator carbon is removed from spent catalyst, that is, fed to the regenerator from the reactor. The computer generates a signal which ultimately controls the combustion air delivered to the regenerator. The aforesaid combustion air control signal is generated by the computer in accordance with an empirical mathematical relationship in response to various input signals delivered to the computer. Among the various input signals delivered to the computer are: temperature differential between dilute and dense phases in the regenerator; the cooling which takes place in the dilute phase by the introduction of quench water steam; change in reactor temperature; change in fresh hydrocarbon feed rate; change in hydrocarbon recycle rate; and, change in feed outlet temperature.

---

This invention relates to an improved method and apparatus for controlling the regeneration of contaminated solids in a fluidized process. More particularly, the invention relates to an improved method and apparatus for controlling the amount of combustion air fed to the regenerator to be used in removing carbon from the catalyst in a fluid catalytic cracking process.

In fluid catalytic cracking processes the catalyst used therein is regenerated by feeding the spent catalyst from the reactor to a regenerator where the catalyst is mixed with combustion air at high temperatures to burn the carbon therefrom. The quantity of air for regeneration is a critical control variable in that an excess of air causes what is known as afterburning in the dilute phase of the regenerator which causes high temperatures while an insufficient amount of air provides inadequate removal of the carbon from the catalyst and thus introduces a limiting feature to the entire fluid catalytic cracking process. It has been recognized that the combustion air can be controlled in accordance with the afterburning in the dilute phase of the regenerator. In other words, the temperature produced by afterburning can be utilized to inversely control the amount of air to stabilize the afterburning and the temperature thereof. This in effect improves the control of catalyst regeneration and consequently improves the catalyst qualities by reducing the residual amount of carbon on the regenerated catalyst. Subsequently, it was discovered that the control of the combustion air can be improved by utilizing as the primary control variable any variation from a predetermined temperature differential between the dilute phase and the dense phase in the regenerator.

Automatic means of controlling processes are steadily gaining acceptance. This has generally come about because of computers and their applicability in solving many of the control problems encountered in processes such as utilized in the oil industry, for example, in cracking. In actual practice the present invention utilizes a digital computer which accepts as inputs predetermined values which are obtained empirically and variables which are measured within the fluid catalytic cracking process. Various computations are made with these inputs to provide a control signal which ultimately provides adjustment of the air flow rate to the regenerator thereby providing control of combustion and resulting control of carbon removal from the catalyst within the regenerator.

It is the main object of the present invention to provide a method for improving regeneration of a catalyst in a fluid catalytic cracking process.

It is another object of the present invention to provide an improved method and apparatus for producing a substantially constant residual carbon on regenerated catalyst.

It is a further object of the present invention to provide an improved method and apparatus for controlling the catalyst regeneration in a fluid catalytic cracking process by controlling the combustion air to the regenerator.

It is a further object of the present invention to provide an improved method and apparatus including a computer for performing predetermined calculations with variables obtained from the fluid catalytic cracking process and providing signal outputs for controlling the amount of air for the regeneration of the catalyst in the regenerator.

According to the invention, the improvement is in a method for controlling the regeneration of contaminated solids in the presence of air in which the regeneration is carried out in a fluidized state in a regeneration zone which contains a dense phase superimposed by a dilute phase and in which the temperature of the dilute phase relative to the dense phase varies due to afterburning in the dilute phase and in which the amount of air is varied in accordance with the variation of the measured temperature differential from the predetermined target temperature differential. The improvement comprises changing the predetermined target temperature differential an amount dependent upon a change in the dense phase temperature and determining the variation of the measured temperature differential from the predetermined temperature differential correlated with the dense phase temperature to provide an output to correct the combustion air flow thereby adjusting the combustion in the regenerator in accordance with the dense phase temperature change and the relative dilute phase temperature to give a substantially constant removal of contaminants from the solids.

The invention further provides for the correction of the measured temperature differential between the dilute and dense phases in accordance with the cooling which takes place in the dilute phase by the introduction of quench water and steam.

The invention further provides for the control of the rate of combustion air flow to the regenerator in accordance with predicted changes derived from changes in the reactor temperature, fresh hydrocarbon feed rate, hydrocarbon recycle rate, and feed heater outlet temperature. The necessary calculations being carried out by a computer.

The above mentioned and other features and objectives of this invention and the manner of obtaining them will become more apparent and the invention itself will be best understood by reference to the following description of the invention taken in conjunction with the accompanying drawings wherein:

FIG. 1 is a schematic diagram of a fluid catalytic cracking unit showing various control and measuring means including a computer for calculating the desired set point of an analog controller in conjunction with the values of measured variables utilized in the computations.

FIG. 2 is a block diagram of a digital computer system which can be used as the process control computer shown in FIG. 1.

FIG. 3 is a graph representing the plot of regenerator bed temperature versus temperature differential ΔT, dilute phase temperature minus dense phase temperature.

FIG. 4 is a schematic diagram representing the functions performed in the arithmetic unit of the digital computer of FIG. 2.

Referring to FIG. 1 of the drawings, there is shown a fluid catalytic cracking reactor 12 having a fluidized bed 14 of solid particles disposed therein. A catalyst regenerator 16 has a fluidized bed 18 therein, the level of which is maintained approximately constant by periodic addition of fresh catalyst. The regenerated catalyst is removed from the bottom of the regenerator 16 via conduit 20. The catalyst passes through a control valve 22 in conduit 20, and through transfer conduit 24 to reactor 12. The amount of catalyst passed by control valve 22 is determined by a temperature measuring and control device 26 which measures the temperature in conduit 24 and in accordance therewith adjusts control valve 22.

Products from the reactor 12, in vapor form, pass upward through cyclone 21 and outlet line 23, to suitable recovery apparatus such as fractionator 25. In the fractionator 25, the cracked product vapor stream is fractioned to provide a desired overhead vapor stream passing by way of line 27 to suitable gas equipment, not shown in the present drawing. In addition a gas oil product and a recycle stream may be taken from the side of the fractionator 25. A gas oil product is taken from fractionator 25 by way of line 29. The gas oil recycle is taken from the fractionator 25 via conduit 31 which contains a pump 33 for pumping the gas oil recycle through a feedback line to mix with the fresh hydrocarbon charge. The residuum product is taken from the bottom of fractionator 25 via conduit 35.

The temperature of the hydrocarbon materials in the reactor 12, specifically the reactor bed 14, or the dense phase mixture of the hydrocarbon vapor, steam and catalyst particles, vary. The temperature of the bed is measured by thermocouple TR28 disposed therein. The electrical signal obtained from the thermocouple TR28 is fed via a wire connection shown by dashed line 30 to computer 32. The hydrocarbon charge or feed that is entrained with the catalyst in conduit 24 is introduced at conduit 34 where a flow measuring and control device 38 and control valve 36 are utilized to maintain the flow rate at a predetermined level. The flow measuring and control device 38 also provides a signal C proportional to the flow via line 40 to computer 32. The hydrocarbon feed is preheated in a heater 42 which is a tube type preheat furnace which provides heat by combustion of fuel gas entering through conduit 44. Also connected to conduit 44 is a control valve 46 which is operated to control the fuel gas to the heater in correspondence with the temperature of the hydrocarbon charge leaving the heater. This measurement is made by temperature measuring and control device 48 which is connected between control valve 46 and conduit 50. Conduit 50 is also connected with conduit 31 by means of which gas oil recycling from the fractionator is added. The recycle line, conduit 31 contains a flow measuring and control device 53 and a control valve 55 which is adjusted in accordance with the flow obtained from the flow measuring and control device 53. Conduit 50 has located therein a temperature measuring device 52 which measures the temperature FT of the mixed hydrocarbon charge and recycle gas oil passing therethrough and which is electrically connected to computer 32 by means of electrical conductor 54 shown as a dashed line. The hydrocarbon charge after being preheated is entrained in conduit 24 with the hot catalyst which is added to the hydrocarbon charge before it enters conduit 24. The combination catalyst, hydrocarbon charge, and recycle gas oil is fed to the reactor 12 via conduit 24. The reactor bed 14 is comprised of catalytic particles fluidized by hydrocarbon vapors and steam. A stream of spent catalyst material is withdrawn from bed 14 via conduit 56. The amount of spent catalyst fed back to the catalyst regenerator for regeneration is controlled by a level measuring device 57 and control device 58. The spent catalyst is then entrained in conduit 60 by means of air supplied by air supply 62 via conduit 64 connected to conduit 60. The air is controlled by a flow measuring and control device 66 and a control valve 67. The spent catalyst entrained in the regeneration air is conveyed via conduit 60 into the bottom of regenerator 16.

The combustion air for the regenerator is provided by air blower 100 via conduit 98. Located in conduit 98 is a flow measuring and control device 102 which adjusts governor valve 104 which in turn controls the amount of steam which is used to drive the turbine of air blower 100. The air flow measuring and control device also provides an electrical signal proportional to the measured air flow rate $W_A$ which is fed to computer 32 via conductor 108 shown in dashed lines. The output of the computer 32 is an analog signal on line 109 which is fed to a pneumatic computer set station 111 such as the Foxboro Model 670P Pneumatic Computer Set Station. The output from the set station on line 113 goes to air flow measuring and control device 102 where it changes the set point of the controller thereby affecting the combustion air by changing the valve 104 to accordingly change the amount of steam driving the turbine of air blower 100. Regeneration of the catalyst by the combustion air in fluidized bed 18 takes place at a temperature preferably between 1080 and 1195° F.

The spent gases from combustion of the carbonaceous solids disposed on the catalyst, pass therefrom through a cyclone 70 and output conduit 72. The temperature of the flue gas is obtained by a temperature measuring device TR114 which transmits the temperature via line 74 to computer 32. The temperature of the flue gas will be higher than the temperature of the regenerator bed because of the afterburning which takes place in the dilute phase of the regenerator. This afterburning which gives rise to high temperatures is caused by the oxygen which is not consumed in burning the carbon or coke from the catalyst in the dense bed. Carbon monoxide, CO, is converted to carbon dioxide, $CO_2$, in the afterburning process. The pressure of the flue gas in the regenerator is maintained by a pressure measurement and control device 75 and a control valve 76 which is connected between the catalyst regenerator 16 and the conduit 72. A combination of water and steam for cooling purposes is supplied to the cyclone 70 of the regenerator 16 via conduit 78. As can be seen the steam and water flow are measured by measuring and control devices 80 and 82, respectively, which in turn are connected to control valves 84 and 86, respectively. The flow measuring and control devices 80 and 82 also provide signals $W_s$ and $W_{cw}$ proportional to the rate of steam flow and the rate of water flow, respectively, which are applied via leads 88 and 90 to computer 32. Water supplied to regenerator bed 18 via conduit 92 is regulated by a measuring and control device 93 and a control valve 95. A signal $W_{sw}$ proportional to the flow of water is also provided by measuring and control device 93 and is fed via line 96 to computer 32.

Considering again the invention it comprises a method and apparatus for regulating the combustion air provided to regenerator 16 via conduit 98 to provide control of the burning of the contaminants from the catalyst. The necessary flow rates and temperatures which as mentioned previously are measured by temperature measuring and control devices are sent to the computer 32 over the various lines shown in dotted form. These various measurements are necessary for the computations to be performed in computer 32 to provide a control signal for regulating the air flow to regenerator 16. The calculated temperature variation of the temperature differential measurement between the dense and dilute phases in the regenerator from a predetermined or set point temperature differential is the primary index which is used to control combustion air flow. However, if the bed temperature varies under these control conditions the amount of contaminants burned from the catalyst varies. Accordingly, the amount of contaminants burned from the catalyst is maintained substantially constant by varying the predetermined or set point temperature differential a predetermined amount corresponding to the bed temperature change. Therefore the control strategy is to manipulate combustion air flow to obtain the desired regenerator temperature differential at the prevailing regenerator bed temperature.

The conventional control equipment previously described is available from many automatic control manufacturers and utilizes pneumatic or electronic energy or combinations of the two as the analog of the measurement and control signals.

In the invention the temperature differential between the dense phase and the dilute phase of the regenerator 16 is measured. The measurement for the dense phase is made by a temperature measuring device TR110, the output of which is fed to computer 32 via electrical conduit 112 shown in the form of a dashed line. The temperature measurement for the dilute phase is provided by temperature measuring device TR114 which is connected in conduit 72 and which also provides a signal via line 74 shown in dashed line to computer 32. The difference between these two temperature measurements determines a measured temperature differential $\Delta T_m$. A predetermined temperature differential $\Delta T_p$ and a predetermined dense phase bed temperature $T_p$ have been empirically determined and stored in computer 32 such that the values can be used in the computations, the variation or difference between the predetermined temperature differential $\Delta T_p$ and the measured temperature differential $\Delta T_m$ can be determined and the air rate adjusted so as to remove the difference. An increase or decrease in the air rate provides an increase or decrease in afterburning thus making $\Delta T_m$ substantially equal to $\Delta T_p$. However, as previously mentioned, another variable which effects the removal of coke from the catalyst in the regenerator is the dense phase bed temperature. An increase in the temperature of the bed with the other variables remaining constant improves the burning efficiency and accordingly removes a greater amount of coke from the catalyst. It has been found that the amount of coke removed from the catalyst can be maintained substantially constant if the predetermined temperature differential $\Delta T_p$ is changed a predetermined amount in accordance with the bed temperature change. The above feature may better be appreciated if the result of an increase or decrease in the bed temperature is considered with the other variables remaining constant. Considering the case where the bed temperature increases, it can be appreciated that due to the higher temperature more carbon is burned from the catalyst thus consuming more oxygen and lowering the amount of oxygen in the flue gases and thus diminishing the afterburn and effecting a decrease in the temperature measured in the dilute phase. A diminishing of the temperature measured in the dilute phase provides for an increase in combustion air to bring the temperature of the dilute phase back to the desired point or temperature. Thus the system will provide more air to remove the upset caused by the bed temperature rise. The result is that the bed temperature change has caused a change in the amount of coke removal. Therefore, to maintain a substantially fixed amount of coke removal from the catalyst a control variable, namely the bed temperature, is utilized to change the predetermined temperature differential $\Delta T_p$ to a new setting, namely to a desired temperature differential $\Delta T_d$ which is predetermined in accordance with the new bed temperature.

Referring to FIG. 3 there is shown a graph wherein the abscissa is graduated into increments of bed temperature in degrees Fahrenheit and the ordinate is in terms of desired temperature differential, $\Delta T_d$, in degrees Fahrenheit. The various points representing $\Delta T_d$ for the correspondingly changing bed temperature forms a straight line representing constant carbon on regenerated catalyst. The values of $\Delta T_d$ for the various values of bed temperature have been determined empirically.

Calculation of the desired temperature differential $\Delta T_d$ for a particular bed temperature is as follows:

$$\Delta T_d = \Delta T_p + K(TR110 - T_p)$$

where:

$\Delta T_d$ = the desired value of $\Delta T$ (temp. differential of dense and dilute phase)
$\Delta T_p$ = a base predetermined $\Delta T$ which gives the desired carbon on catalyst at the base temperature
$T_p$ = the base predetermined temperature
TR110 = the catalyst bed temperature
K = change in afterburn required for a change in bed temperature.

As can be seen from the above equation the variable temperatures entering therein are all generated in the equipment previously described and are automatically entered into computer 32 while the predetermined values are manually entered for use in the calculations.

A further improvement in the control apparatus and method for use with a catalyst regenerator in a fluid catalytic cracking unit is obtained by taking into consideration in a combustion air control system the correction to the measured differential temperature $\Delta T_m$ required by the injection of the cooling water and steam into the regenerator. The calculations which are performed by the computer 32 in this connection are as follows:

$$\Delta T_c = \frac{W_{cw}[H_v + SH_s(TR114 - T_p)] + W_s[SH_s(TR114 - T_p)]}{W_A \cdot SH_A + W_{sw}(SH_s)} + R_L$$

$\Delta T_c$ = differential temperature correction in ° F.
$W_{cw}$ = cooling water flow in pounds
$H_v$ = heat of vaporization of water B.t.u./lb.
$SH_s$ = sensible heat of water vapor B.t.u./lb./° F.
TR114 = flue gas temperature in ° F.
$T_p$ = base predetermined temperature
$W_s$ = cooling steam flow in pounds
$W_A$ = total air flow in pounds
$SH_A$ = sensible heat of air B.t.u./lb./° F.
$W_{sw}$ = spray water flow in pounds
$R_L$ = temperature drop due to radiation losses, ° F.

This temperature differential correction $\Delta T_c$ provides a further refinement of the amount of air which is fed to the regenerator to cause combustion and removal of the coke from the catalyst. The result, of course, being a much better regulated removal of coke from the catalyst and an improved quality of the regenerated catalyst.

Since the temperature in the regenerator is slow to change in response to an air flow change, measurements of variables selected from the fluid catalytic cracking unit were obtained which would affect the required amount of air supplied to the regenerator for combustion. In accordance therewith the following calculation is performed by the computer to provide a change in air flow rate in accordance with various changes in the selected variables entering into the calculation. The calculation performed by the computer is as follows:

$$\Delta W_A = \Delta W_{AT} + K_1 \cdot \Delta C + K_2 \cdot \Delta R + K_3 \cdot \Delta FT + K_4 \cdot \Delta \Delta FT + K_5 \cdot \Delta RT + K_6 \cdot \Delta \Delta RT$$

where:

$\Delta W_A$ = change in air rate
$\Delta W_{AT}$ = change in air flow rate due to afterburn calculation
$K_{1-6}$ = air change for change in variable
$\Delta C$ = change in fresh feed rate
$\Delta R$ = change in recycle rate
$\Delta FT$ = change in feedline temperature
$\Delta \Delta FT$ = rate of change in feedline temperature
$\Delta RT$ = change in reactor temperature
$\Delta \Delta RT$ = rate of change in reactor temperature The utilization of the various analog signals, representative of the various measured variables entering into the calculations will now be described in more detail in connection with the computer 32 of FIGURE 1, shown in more detail in FIG. 2. As can be seen the computer is broken down into the general broad functions which are well known in digital computers. It should be understood, therefore, that the individual components of the computer are not to be considered the invention, the invention resides in the combination of these computer elements into a specific cooperation in combination with the various variable measuring devices and output means for improving the control of the combustion air to the regenerator thereby providing a more uniform residual coke on the regenerated catalyst. Accordingly, any computer either digital or analog which is capable of solving the equations set forth above could be utilized in the inventive combination. One example of such a computer is the Bunker Ramo Corporation (TRW) 330 system. Since a digital computer is not a continuous real time control device a control program cycle of five minutes was selected.

Referring now to FIG. 2, it can be seen that the various measured process variables are utilized as inputs to the analog input subsystem 114 in electrical form and the fixed values are inserted by the operator at the operator's console 124. The input signals to the analog input subsystem 114 are converted therein into a digital form. A number of analog to digital converters are well known in the digital computer art. This subsystem is capable of accepting inputs from such devices as potentiometers, resistance temperature detectors, and thermocouples. Once in digital form the information is stored in the memory subsystem 116. The memory subsystem 116 can be any medium capable of memory. The actual computer utilized has a magnetic drum memory which was of sufficient capacity to provide storage space for program instructions, data and process originated information. It should be appreciated that all of the inputs to the analog input subsystem are placed in storage in the memory subsystem.

The arithmetic and control subsystem 118 has two functions: computing and manipulating digital quantities, and controlling and directing internal computer functions. To accomplish these arithmetic and control functions a flexible set of program commands and programmable solid state electronic registers are provided. Other registers that are not programmable but are used in the computer execution sequence are also included.

As the list of program instructions or commands are examined by the control circuits, the registers and their associated circuits perform computations and functions as directed by the program. A counter subsystem 120 is provided for counting various events taking place in the process, for comparing counts, and for timing for various computer actions. One track of memory is reserved for the counter subsystem. This track and associated subtrack and comparison circuits provide three types of counters: event counters, elapsed time counters, and pulse duration counters. An event counter accumulates a running sum of the number of times a specific event within the process has occurred. An elapsed time counter produces an interrupt to the computer or a contact closure to the process after a specified amount of time has elapsed. The pulse duration counter produces an output pulse of a specified duration.

The analog output subsystem 126 converts computer generated digital quantities into variable resistances, voltages, or occurrences for use in the control of process connected analog controllers. All analog outputs provided by this subsystem are of the resistance divider output type or motor driven potentiometer outputs. In the actual analog output subsystem utilized the total number of analog outputs available were 143. The interrupt subsystem automatically and continuously scans a set of interrupt source lines for changes in key process or computer operating conditions. The operator's console 124 functions as a man-machine communication device. The console houses all controls and indicators necessary to provide complete communications control between operator and computer operations. The peripheral equipment 128 consists of a number of peripheral devices which are available for input or output communication with the control computer system. This peripheral equipment includes apparatus such as flexowriter, logging typewriter, high-speed tape punch, high-speed paper tape reader, alarm printer, teletype, etc.

Referring again to the equations, and more particularly to the equation for solving for the desired temperature differential $\Delta T_d$, the computer is programmed to solve the particular problem. For example, all the variables which are utilized as inputs to the computer are stored in the memory subsystem while the fixed values are entered by the operator through the operator's console. In the case of the solution of the equation to obtain the desired temperature differential $\Delta T_d$ the variable representing the temperature of the catalyst bed TR110 and the predetermined base temperature $T_p$ are located and applied to the arithmetic unit of the arithmetic and control subsystem where the difference between them is taken. This difference is multiplied by a further predetermined value K which is utilized to multiply the temperature difference taken. The resulting value is added to a base predetermined temperature differential $\Delta T_p$ which is known to give the desired carbon on catalyst at the base temperature $T_p$. The answer, the desired temperature differential $\Delta T_d$, is now put into storage for subsequent utilization. Likewise, the various mathematical steps indicated by the equation which gives $\Delta T_c$ (differential temperature correction in degrees Fahrenheit) are performed according to the program in the arithmetic section of the arithmetic and control subsystem 118 and the correction value is added to or subtracted from the measured temperature differential $\Delta T_m$. Once the desired temperature differential $\Delta T_d$ has been determined, the computer calculates the difference between the corrected $\Delta T_m$ and $\Delta T_d$ to get an error signal $\Delta W_{AT}$ which is utilized in changing the combustion air. In other words, the computer calculation results in a signal which affects the air flow to correct the regenerator operation and return the temperature to the desired $\Delta T_d$ and thereby maintain the amount of coke remaining on the regenerated catalyst substantially constant.

The equation which solves for $\Delta W_A$ (the change in air flow rate) is likewise performed in the computer in accordance with the directions given thereto by a predetermined program. The variables which enter into the calculations are not only the previous signal to correct the air rate calculated from $\Delta T_d$ but also the change in feed rate $\Delta C$, the change in recycle rate $\Delta R$, the change in feed line temperature $\Delta FT$, and the change in reactor temperature. $\Delta RT$ It will be appreciated that these $\Delta$ or change values are obtained from successive values of the variable by subtraction. From successive calculations of $\Delta FT$ and $\Delta RT$, the rate of change thereof is determined by the computer and utilized in the calculation. The resulting air flow change $\Delta W_A$ is the output of the computer and accordingly causes a change in the governor value setting on the turbine to correspondingly increase or decrease the air flow rate.

It will be appreciated that the arithmetic unit of the computer is essentially a sequential or serial device, that is, the computations do not all take place at once but are arranged sequentially or serially, one computation following another as the program progresses. Since the various signals are converted to a digital form, that is, a number of pulses representing the value of the analog signal, the tracing of the computations in the arithmetic unit becomes quite involved. Accordingly, a simple functional explanation of the arithmetic process as it might be carried out in an analog or a completely serial digital computer will be set forth below in conjunction with FIG. 4. It will be appreciated that in most digital computers the arithmetic operations are performed by a common set of registers and components. The arithmetic process is illustrated here as an analog device for he sake of convenience and understanding.

In FIG. 4, the temperature of the regenerator bed TR110 is carried on line 112 to a subtracting component 132. A second signal $T_p$, a predetermined base temperature, is introduced to subtractor 132 via line 134. The two values are subtracted, that is, the difference between the two is determined as an output on line 136 which is connected to a multiplying component 138. A second input is applied to multiplying component 138 via line 140. This input consists of a value K which represents the change in afterburn required for a change in bed temperature. This value has been established empirically and is introduced manually as a constant. The multiplying unit 138 multiplies the difference value on line 136 and the constant K to obtain an output product on line 142 which leads to an adding component 144. A second input to adding network 144 is $\Delta T_p$ which represents a predetermined base temperature differential which is added to the product on line 142 to produce as an output on line 146 the desired temperature differential $\Delta T_d$.

Now considering the equation to obtain the temperature differential correction $\Delta T_c$, there is an input $T_p$, previously defined, applied to difference taking component 152 via line 154. The difference between $T_p$ and the flue gas temperature TR114 which is applied to component 152 via line 156 is obtained as an output from component 152 on line 158. The difference value is multiplied in component 160 by a further input $SH_s$, the sensible heat of water vapor as previously defined applied to multiplier 160 via line 161. The product value output from component 160 is connected to component 162 via line 164 and is connected to multiplying component 166 via line 168. A further input $H_v$, heat of vaporization of water, is introduced to adding component 162 via line 170 where it is added to the product output of multiplier 160 to give a summation output on line 172 from adding component 162. A further input to multiplying component 166 is $W_s$, the cooling steam flow, which is multiplied by the product value on line 168 from multiplying component 160. The product from multiplier 166 is introduced to adding network 178 via line 176. The output on lead 172 from adder 162 is introduced to a multiplier 182 wherein a new value $W_{cw}$, cooling water flow, introduced on line 172 is multiplied therewith. The output product on line 184 forms the second input to adding component 178 which is added to the input on line 176 to produce the summed output on lead 186 forming an input to divider 188.

The other value entering divider 188 is obtained by introducing a variable $W_{sw}$, spray water flow, to a multiplying component 192 via line 190 wherein the value is multiplied with a second value $SH_s$ as defined above introduced via line 191. The product of the two values is applied to adding component 194 via line 196. A second input to the adder 194 is obtained as the product output from a multiplying component 198 via line 200. This output product consists of the multiplication of $W_A$, total air flow, and $SH_A$, sensible heat of air, which are introduced to multiplying component 198 via leads 202 and 204, respectively. The output of adding component 194 is utilized as the second input to divider 188 via line 206. The output of divider 188 via line 210 is added to the radiation losses, $R_L$, via line 177 by adder 174 to yield the desired temperature differential correction value $\Delta T_c$. The temperature differential correction value $\Delta T_c$ on line 180 is applied to subtracting component 212 where $\Delta T_c$ is subtracted from the temperature differential presently existing in the regenerator. As can be seen this value is obtained by introducing to subtracting component 218 via leads 214 and 216, respectively, the signals TR110 and TR114 proportional to the temperature measurements of the bed and the flue gas respectively. The difference between these two values obtained in difference measuring component 218 is a temperature differential output which is connected to subtracting component 212 via lead 220. Subtracting component 212 subtracts the temperature differential connection from the measured temperature differential to get a measured temperature differential corrected for cooling due to water and steam injection on output line 224 connected to subtracting component 222. The difference between the measured temperature differential $\Delta T_m$ and the desired temperature differential $\Delta T_d$ obtained previously from the above computation is obtained as the output from component 222 on line 256. This output is proportional to the air rate change due to afterburning, $\Delta W_{AT}$. This value in conjunction with the subsequent calculations determines actual change in air rate.

The various functional steps performed in the arithmetic unit of the computer to obtain the change in air flow rate determined in accordance with the previously described equation is obtained as follows. Inputs C, R, FT and RT all of which have been previously defined are compared with the respective previous values and the differences introduced to respective multipliers 226, 228, 230, and 234 via respective lines 225, 227, 229 and 231. Introduced to the same multipliers 226, 228, 230 and 234 are constants $K_1$, $K_2$, $K_3$ and $K_5$, respectively. The input $\Delta FT$ is also connected via line 233 to a differentiating component 235 which produces as an output on line 237, $\Delta \Delta FT$, the rate of change in feed line temperature, which forms an input to a multiplying component 232. The multiplier 232 multiplies the input $\Delta \Delta FT$ by a constant $K_4$ introduced as a second input to multiplying component 232 via line 239. The input $\Delta RT$ is also connected to a differentiating component 241 via line 240 which produces as an output via line 243, $\Delta \Delta RT$, the rate of change of reactor temperature, which forms an input to a multiplying component 236. The multiplier 236 multiplies the input $\Delta \Delta RT$ by a constant $K_6$ introduced as a second input to multiplying component 236 via line 245. The product output from each of multipliers 226, 228, 230, 232, 234 and 236 is connected to summing network 247 via lines 242, 244, 246, 248, 250, and 252, respectively. A further input $\Delta W_{AT}$ is obtained via output line 256 leading from subtracting component 222 to summing network 247 where it is summed with the above mentioned product inputs to produce an output signal proportional to the change in air flow rate, $\Delta W_A$. This output signal in the analog mechanization is applied to a controller which controls the governor of the turbine to adjust the air rate accordingly while in a digital mechanization it would be applied to analog output subsystem 126 (FIG. 1) for conversion from a digital form to an analog form for application to the air turbine controller.

It will be appreciated that the arrangement described herein for the arithmetic unit can be simplified considerably from an apparatus point of view, for example, by time sharing techniques. Also, the invention is not limited to use in a fluid catalytic cracking process but may be used in any process where regeneration of the catalyst or the like is provided by burning contaminants therefrom by the use of air or other combustion supporting gas.

Obviously, many modifications and variations of the invention as hereinabove set forth, may be made without departing from the spirit and scope thereof, and therefore, only such limitations should be imposed as are indicated in the appended claims.

We claim:

1. A method for regulating the regeneration of contaminated solids in a fluid regeneration system of the type having a dense phase bed superposed by a dilute phase in which afterburning takes place, and in which regulation of combustion air flow is obtained in accordance with variations in temperature from a predetermined temperature differential between the dense and dilute phases, the improvement comprising measuring a change in temperature of the dense phase bed, changing the predetermined temperature differential which establishes the set point of regulation by an amount predetermined in accordance with the temperature change of the dense phase bed to obtain a new set point of regulation, measuring the present temperature differential between the dilute and dense phase, producing a signal proportional the variation of the present temperature differential from the new set point temperature differential, and varying the combustion air flow rate in accordance with said proportional signal to regulate the regeneration of the contaminated solids; said measured temperature differential between the dilute phase and dense phase is corrected in accordance with the amount of cooling in the dilute phase provided by inserting cooling water, spray water and steam into said regeneration system.

2. A method according to claim 1, wherein the correction added to the measured temperature differential in accordance with the amount of cooling in the dilute phase provided by inserting cooling water, spray water and steam is calculated according to the equation:

$$\Delta T_c = \frac{W_{cw}[H_v + SH_s(TR114 - T_p)] + W_s[SH_s(TR114 - T_p)]}{W_A(SH_A) + W_{sw}(SH_s)} + R_L$$

wherein:

$\Delta T_c$ = differential temperature correction in ° F.
$W_{cw}$ = cooling water flow in pounds
$H_v$ = heat of vaporization of water B.t.u./lb.
$SH_s$ = sensible heat of water vapor B.t.u./lb./° F.
$TR114$ = flue gas temperature in ° F.
$T_p$ = base predetermined temperature
$W_s$ = cooling steam flow in pounds
$W_A$ = total air flow in pounds
$SH_A$ = sensible heat of air B.t.u./lb./° F.
$W_{sw}$ = spray water flow in pounds
$R_L$ = temperate drop due to radiation losses, ° F.

3. A method for regulating catalyst regeneration in a fluid catalytic cracking unit in accordance with a control signal calculated by a programmed computer comprising: measuring the regenerator dense phase bed temperature TR110, measuring the regenerator dilute phase temperature TR114, and measuring the reactor temperature TR28; measuring the cooling water flow $W_{cw}$ inserted into the dilute phase of said regenerator, measuring the cooling steam flow $W_s$ inserted into the dilute phase of the regenerator, measuring the total combustion air flow $W_A$ inserted into the regenerator, and measuring the spray water flow $W_{sw}$ inserted into said regenerator; measuring the hydrocarbon charge feed rate C inserted into said catalytic working unit and calculating the change in hydrocarbon charge feed rate $\Delta C$, measuring the recycle rate of gas oil R and calculating the change in recycle rate of gas oil $\Delta R$, measuring the temperature of hydrocarbon charge input line FT, and calculating the change in hydrocarbon charge input line $\Delta FT$, and measuring reactor temperature RT and calculating the change in reactor temperature $\Delta RT$; inserting into said computer a signal representing a predetermined temperature $T_p$, a signal representing a predetermined temperature differential $\Delta T_p$, and a signal representing a constant K proportional to a change in afterburning required for a change in bed temperature; inserting into said computer a signal representing heat of vaporization of water $H_v$, a signal representing sensible heat of water vapor $SH_s$, a signal representing sensible heat of air $SH_A$, a signal representing temperature drop due to radiation losses $R_L$, and signals proportional to constants $K_1$ thru $K_6$ representing air changes for a change is associated variables; providing in the program of said computer a change in air flow rate calculation, a temperature differential correction calculation, and a predictive change in air flow rate calculation; computing the change of air flow rate proportional to the difference between said desired temperature differential $\Delta T_d$ and the measured temperature differential $\Delta T_m$ in accordance with said change in air flow calculation; computing the temperature differential correction for cooling introduced to the dilute phase of said regenerator by the insertion of said cooling water, spray water and steam in accordance with said temperature differential correction calculation; computing a predictive air flow rate change in accordance with said predictive air flow rate change calculation; correcting the computed change of air flow rate by said computed temperature differential correction; and adding said computed change of air flow rate to said computed predictive air flow rate change to get a change of air flow control signal; passing said change of air flow control signal to an air generating means for said regenerator to regulate the air flow accordingly and thereby regulate the catalyst regeneration.

4. Apparatus for regulating the catalyst regeneration in a fluid catalytic cracking system comprising in combination: a catalyst regenerator having a dense and dilute phase therein; a first means for providing a signal proportional to the temperature of the dense phase of said regenerator; a second means for providing a signal proportional to the temperature of said dilute phase of said regenerator; means for supplying air to said regenerator for burning contaminants from the catalyst therein; a computer; means for conveying said signals provided by said first and second means to said computer; manual means for inserting a signal proportional to a predetermined dense phase temperature and a signal proportional to a predetermined temperature differential between said dilute and dense phases into said computer; means in said computer for calculating a desired temperature differential $\Delta T_d$ based on said predetermined dense phase temperature and said predetermined temperature differential; said desired temperature differential $\Delta T_c$ varies as a predetermined function of the dense phase temperature of the regenerator; further calculating means in said computer for calculating the change in air flow rate $\Delta W_{At}$ in accordance with the difference between said desired temperature differential $\Delta T_d$ and the measured temperature differential $\Delta T_m$ between the dense phase temperature and the dilute phase temperature of said regenerator; a first conduit for conveying cooling steam and water to the dilute phase of said regenerator; a second conduit for conveying spray water to said regenerator; a third conduit for conveying combustion air to said regenerator dense phase; manual means for inserting into said computer signals proportional to the heat of vaporization of water, sensible heat of water, sensible heat of air and temperature drop due to radiation losses; first measuring means for providing a first signal proportional to the measurement of the cooling water flow in said first conduit; second measuring means for providing a second signal proportional to the measurement of the cooling steam flow in said first conduit; third measuring means for providing a third signal proportional to the measurement of the spray water flow in said second conduit; fourth measuring means for providing a fourth signal proportional to the measurement of the combustion air flow in said third conduit; means for conveying each of said first, second, third and fourth signals to said computer; means in said computer for making a differential temperature correction calculation based on said input signals; means for correcting the measured temperature differential in accordance with said calculated differential temperature correction; a fourth conduit for conveying input hydrocarbon fresh feed charge into said fluid catalytic cracking unit; a fifth conduit for conveying recycle gas oil from an output of said fluid catalytic cracking unit to said fourth conduit for mixing with said input hydrocarbon fresh feed charge; means in said fourth conduit for adding regenerated catalyst from the regenerator to the mixed hydrocarbon charge and gas oil recycle; a reactor in which the input hydrocarbon fresh feed and said catalyst are further contacted to obtain a reaction; means for conveying the spent catalyst from the reactor to the regenerator for regeneration; means for measuring and providing a signal proportional to the hydrocarbon fresh feed charge flow rate in said fourth conduit, means for measuring and providing a signal proportional to the gas-oil recycle flow rate in said fifth conduit; means for measuring and providing a signal proportional to the temperature in said fourth conduit; means for measuring and providing a signal proportional to the reactor temperature; means for inserting said signals into said computer, means in said computer for calculating the changes in said hydrocarbon fresh feed charge flow rate, said gas-oil recycle flow rate, said temperture in said fourth conduit, and said reactor temperature; means for inserting in said computer signals proportional to constant values $K_1$ through $K_6$ each of which represents a predetermined air change for a change in the corresponding flow rate change and temperature change; means in said computer for calculating a change in air flow rate including the change in air flow rate provided by said desired temperature differential calculation and based on said calculated changes in flow rate and temperature in said fourth and fifth conduits, said inserted constant values and said temperature change in the reactor.

References Cited

UNITED STATES PATENTS

| | | | |
|---|---|---|---|
| 2,374,660 | 5/1945 | Belchetz et al. | 252—417 |
| 2,409,751 | 10/1946 | Gerhold et al. | 208—163 |
| 3,175,968 | 3/1965 | Berger | 208—164 |
| 3,206,393 | 9/1965 | Pohlenz | 208—164 |
| 3,213,014 | 10/1965 | Atkinson et al. | 208—164 |
| 3,316,170 | 4/1967 | Stewart et al. | 208—164 |

DELBERT E. GANTZ, *Primary Examiner.*

HERBERT LEVINE, *Assistant Examiner.*